United States Patent [19]

Bidlack et al.

[11] 4,096,358

[45] Jun. 20, 1978

[54] KEY TELEPHONE SYSTEM SIGNAL PRIORITY ARRANGEMENT

[75] Inventors: Richard Henry Bidlack, Boonton; Wayne Jay Egan, Eatontown; Steven Gary Miller, Freehold Township, Monmouth County, all of N.J.

[73] Assignee: Bell Telephone Laboratories, Incorporated, Murray Hill, N.J.

[21] Appl. No.: 689,379

[22] Filed: May 24, 1976

[51] Int. Cl.² ............................................. H04M 1/00
[52] U.S. Cl. ............................... 179/99; 179/18 AD; 179/27 FE
[58] Field of Search ........ 179/99, 1 H, 1 HF, 18 AD, 179/18 BH, 18 D, 37, 81 B, 27 FE

[56] References Cited

U.S. PATENT DOCUMENTS

| 3,509,285 | 4/1970 | Banks et al. | 179/18 BH |
| 3,584,151 | 6/1971 | Kielar | 179/1 A |
| 3,904,834 | 9/1975 | Shinoi et al. | 179/99 |
| 3,976,847 | 8/1976 | Bidlack et al. | 179/81 B |
| 3,979,563 | 9/1976 | Kita et al. | 179/81 B |
| 4,011,415 | 3/1977 | Takematsu | 179/99 |

*Primary Examiner*—William C. Cooper
*Assistant Examiner*—Gerald L. Brigance
*Attorney, Agent, or Firm*—James M. Graziano; David H. Tannenbaum

[57] ABSTRACT

A key telephone system signal priority arrangement is disclosed wherein each type of call in a key telephone system is assigned a distinctive priority. When a call is directed to a station engaged in an existing lower priority call, a warning tone is given to both parties engaged in this existing call. The existing call is then automatically placed on hold while the preempting call is completed to the called station such that the called station can answer the preempting call "hands-free".

9 Claims, 2 Drawing Figures

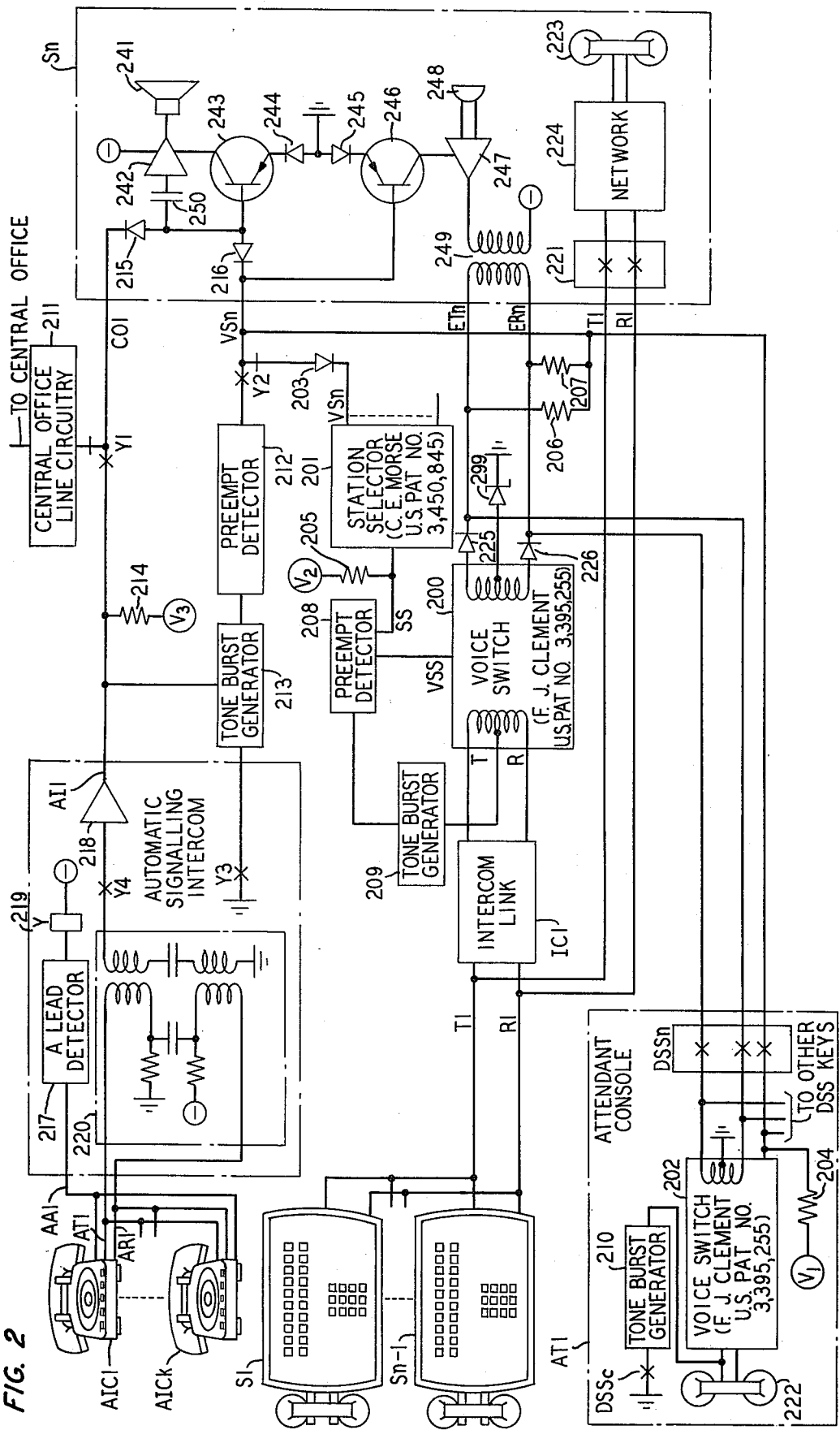

KEY TELEPHONE SYSTEM SIGNAL PRIORITY ARRANGEMENT

BACKGROUND OF THE INVENTION

1. Field of the Invention

This invention relates to a key telephone system and in particular to a signal priority arrangement for "hands-free" communication systems.

2. Description of Prior Art

Prior art key telephone system station signal arrangements have used ringers, buzzers, or lighted lamps to indicate the arrival of an incoming call to a party engaged in an existing call. To place an existing call on hold, the called party must operate the hold button on the key telephone set and only then can the incoming call be answered by depressing the appropriate pick-up button.

A prior art call priority arrangement is the executive override feature wherein certain stations assigned a priority class of service can bridge onto an existing call and request that the existing call be terminated. In this fashion, the executive can obtain an idle line based on the class of service of his key telephone set, thus establishing a rudimentary call priority arrangement.

An improvement over these two arrangements is shown by the teaching of the Shinoi et al patent, U.S. Pat. No. 3,904,834, issued Sep. 9, 1975 wherein station signaling is combined with call priority. The Shinoi et al patent shows a key telephone system in which stations are equipped with speakerphone facilities for use in both intercom and central office calls. When an incoming intercom call is directed to a key telephone station presently engaged in a speakerphone central office call, the speakerphone equipment in the called station is switched into the receive mode and both incoming intercom and central office call signals are simultaneously broadcast through the speakerphone loudspeaker. No warning tone is given to the parties engaged in the existing call and, as in other prior art systems, the user at the called key telephone station must operate a switch to place the existing call on hold before the incoming call can be answered.

In prior art station signaling arrangements, the called party is required to manipulate the station set to answer an incoming call. This is true of both loudspeaking intercom systems as well as standard key telephone systems. Additionally, prior art station signaling arrangements have either no call priority scheme or at best only a limited call priority scheme. The Shinoi patent teaches a limited call priority scheme wherein incoming intercom calls can override an existing central office call but as to the other types of calls in the key telephone system, the Shinoi arrangement has no call priority scheme. The aforementioned executive override arrangement provides executive phones with priority over existing intercom calls but otherwise the associated telephone system has no call priorities.

In key telephone systems, it is obviously desirable to provide a complete hierarchy of call priorities so that certain types of calls can preempt others. In loudspeaking key telephone systems, it is desirable to provide facilities to enable the called party to answer an incoming preempting call "hands-free" without having to manipulate the station set.

In view of the foregoing, an object of this invention is to provide a complete hierarchy of call priorities in a loudspeaking intercom system such that the called party is able to answer incoming preempting calls "hands-free" without having to manipulate the station set.

It is a further object of this invention to provide a tone indication to the parties engaged in the existing call to indicate the reason for the call interruption.

SUMMARY OF THE INVENTION

In accordance with our invention, we provide facilities for establishing a hierarchy of call priorities so that certain calls can preempt others in loudspeaking key telephone systems. Additionally, we provide facilities enabling the called party to answer incoming preempting calls "hands-free" without having to manipulate the station set.

This is accomplished by equipping all or some key telephone station sets in the system with a loudspeaker and microphone arrangement in addition to the regular communication handset. Calls are originated in the standard manner and are extended via a bi-directional communication path to voice switching circuitry in the common equipment. A unidirectional communication path exists from the voice switch circuit through signal priority circuitry to the loudspeaker arrangement in the called station. A separate unidirectional communication path also exists in the reverse direction, extending from the microphone arrangement in the called station to the common voice switching circuitry.

The signal priority circuitry automatically determines the relative priorities of concurrently occurring calls and automatically places the lower priority call on hold. This is accomplished by maintaining the unidirectional communication path from the voice switch to the called station associated with the lower priority call in an active but noncommunicating condition for the duration of the preempting call. Thus, in the disclosed arrangement, the automatic hold function is combined with the call preempting function to provide automatic preempting with "hands-free" answer.

Accordingly, it is a feature of the invention to provide, in a loudspeaking key telephone system, facilities for establishing a complete hierarchy of incoming call priorities so that certain types of calls can preempt others.

A further feature of the invention is the provision of facilities for automatically placing a preempted call in an active noncommunicating condition for the duration of the preempting call.

Another feature of the invention is the provision of facilities for enabling the called subscriber to answer incoming preempting calls "hands-free" without having to manipulate the station set.

Another feature of the invention is the provision of facilities for alerting the parties engaged in an existing call that the call is being preempted by an incoming call having a higher priority.

BRIEF DESCRIPTION

The operation and utilization of the present invention will be more fully apparent from the following description, in which:

FIG. 2 shows a detailed circuit diagram of a preferred embodiment of the invention.

GENERAL DESCRIPTION - FIG. 1

Figure 1:
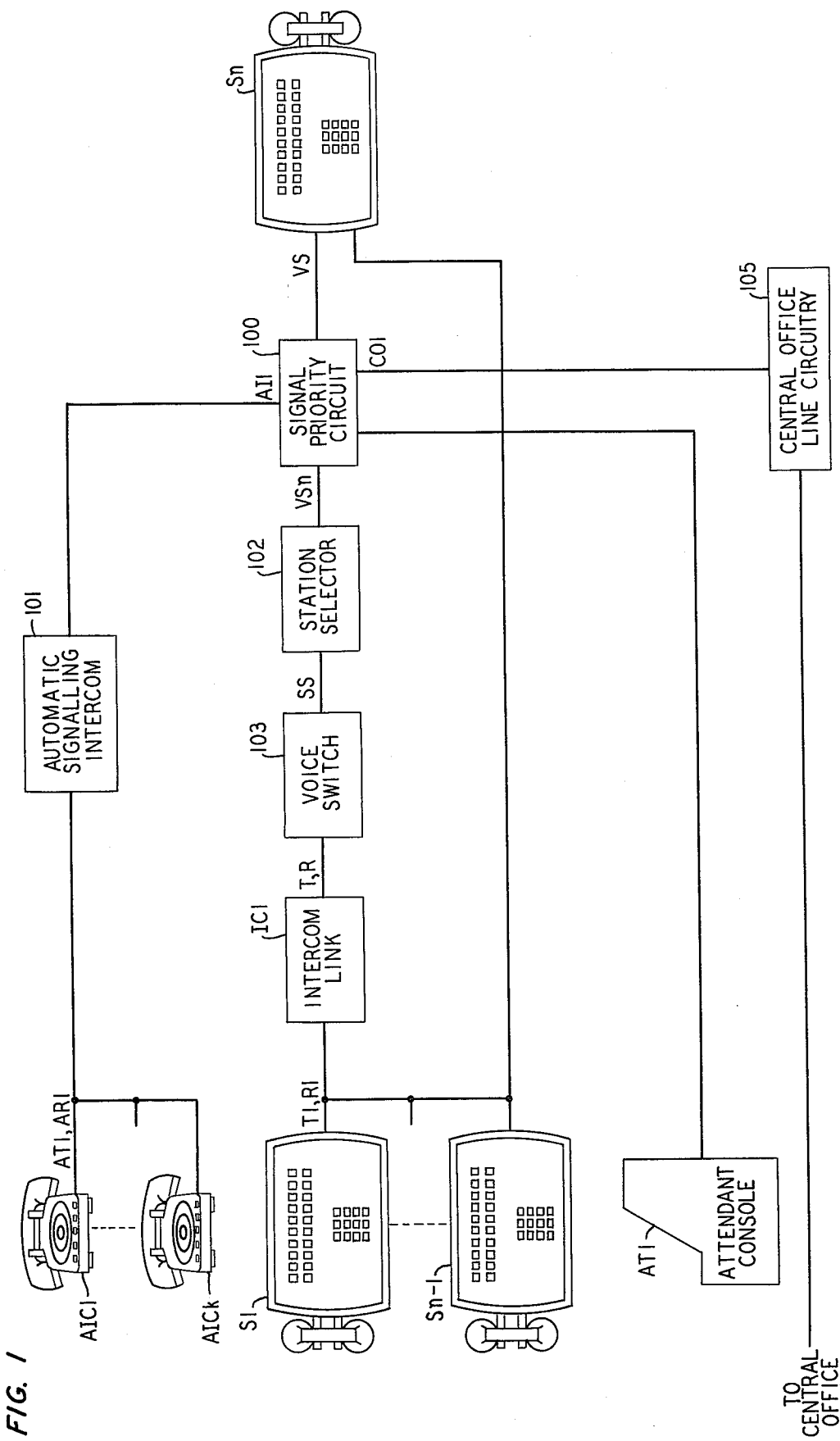
FIG. 1 illustrates one embodiment of the invention in block diagram form.

FIG. 1 shows one embodiment of our invention wherein a number of key telephone station sets S1 - Sn are connected to common intercom equipment. The common intercom equipment consists of an intercom link IC1, station selector 102, and voice switch circuitry 103.

Each key telephone station set is equipped with line pickup keys which enable the station user to access any one of the number of intercom links in the system. For clarity, only one intercom link, IC1, is shown. Intercom link IC1 is accessed by the subscriber depressing the line pickup button associated with this intercom link, thus establishing a communication connection from the station handset to intercom link IC1 via leads T1 and R1.

A number of station sets AIC1-AICk are also shown. These station sets are connected to automatic signaling intercom circuit 101 wherein a subscriber at station AIC1, by merely going off-hook on automatic signaling intercom line, leads AT1 and AR1, is automatically connected to station Sn by automatic signaling intercom circuit 101. A central office line connected to central office line circuitry 105 is also shown, as is an attendant console AT1.

The invention can be further appreciated by describing the processing of a typical preempting call. Assume that the subscriber at key telephone station set Sn is engaged in an existing intercom call with a subscriber at key telephone station set S1. The subscriber at station S1 is connected by leads T1 and R1 to intercom link IC1. Leads T and R further connect intercom link IC1 with voice switch 103 which is connected to station selector 102 by lead SS. Station selector 102 extends this communication path via lead VSn through signal priority circuit 100 to station Sn. Further assume that the attendant at attendant console AT1 wishes to call the subscriber at key telephone station Sn. The attendant accomplishes this by picking up the handset and depressing the direct station selection button associated with key telephone station set Sn. This operation connects the attendant to the signal priority circuit 100, which is arranged to assign a distinctive priority to each type of call. The hierarchy of call priorities in the disclosed embodiment is, in order of decreasing priority:

Direct Station Selection
Automatic Signaling Intercom
Intercom
Central Office.

Thus, the signal priority circuit recognizes that attendant originated calls are given a higher priority than intercom calls, and so causes a tone signal to be given to the subscribers at stations S1 and Sn. The intercom call from the subscriber at station S1 is placed in an active noncommunicating condition by the signal priority circuit and the attendant is connected to the subscriber at key telephone station set Sn. Upon completion of this preempting call, the signal priority circuit reconnects the original intercom call between station Sl and Sn.

DETAILED DESCRIPTION - FIG. 2

Drawing FIG. 2 illustrates how the various elements or our inventive embodiment cooperate to provide the signal priority arrangement. The various equipments such as key telephone station sets, voice switching circuitry, etc., are oriented with respect to each other on FIG. 2 in a manner analogous to FIG. 1.

The description of FIG. 2 is made with respect to the same call conditions assumed for FIG. 1; namely, a subscriber at station Sn engaged in an existing intercom call with a subscriber at intercom station S1 receives a preempting direct station selection call from the attendant at attendant console AT1.

Intercom Calls

The processing of an intercom call in the disclosed embodiment is thoroughly discussed in copending application R. H. Bidlack et al, Ser. No. 631,410, filed Nov. 12, 1975. Briefly summarizing the information contained therein, the station user at station S1 originates an intercom call in the standard manner by picking up the handset, depressing the line key associated with intercom link IC1 and dialing the number of the called station, in this case station Sn. Station S1 is thereby connected by a bi-directional communication path through intercom link IC1 and over leads T and R to voice switch 200.

Voice Switch

Voice switching communication circuits are well known, especially in the loudspeaking telephone art. The voice switch circuit taught by F. J. Clement, U.S. Pat. No. 3,395,255 issued July 30, 1968 is illustrative of the type of voice switch used in the disclosed embodiment. A voice switch circuit enables conventional 2-wire station sets to communicate with loudspeaker and microphone equipped stations which require two unidirectional communication paths. In the present disclosure, station set S1 is being used in the conventional 2-wire mode and thus is connected to the 2-wire input, leads T and R, of voice switch 200. The unidirectional communication from voice switch 200 to called station set Sn is applied by voice switch 200 to lead VSS while the return unidirectional communication from station Sn to voice switch 200 arrives at voice switch 200 from leads ETn and ERn through diodes 225 and 226 and thence via common voice communication path, leads ET and ER. Leads ET and ER are common leads, being connected to all loudspeaking key telephone station sets in the system. Thus, voice switch 200 extends the intercom communication path from intercom link IC1 to preempt detector 208 via lead VSS and thence to station selector 201 via lead SS.

Station Selector 201

Station selectors are a basic part of key telephone systems and are well known in the art. The station selector used in the present disclosure is of the type taught by C. E. Morse, U. S. Pat. No. 3,450,845 issued June 17, 1969. These station selectors function to detect and count the dial pulses generated by the calling station. In response to the dialed digits, the station selector operates a ringer selection network to signal the station uniquely described by the dialed digits.

In the disclosed embodiment, station selector 201 differs from that taught by the C. E. Morse patent in that the ringing generator used to signal the called station has been replaced by a tone generator. Also, the ringer selection network is used to establish a unidirectional voice communication path from voice switch 200 to called station Sn via lead VSn. Thus, station selector 201 constitutes an integral portion of the intercom voice communication path rather than merely functioning to signal the called station.

Station SN Loudspeaker and Microphone Arrangement

All loudspeaking key telephone station sets in the disclosed system are equipped with loudspeaker and microphone facilities, herein disclosed in called station set Sn. These facilities include amplifier 242 which amplifies incoming voice signals that pass through dc blocking capacitor 250 from communication leads VSn and CO1. Amplifier 242 applies the amplified signals to loudspeaker 241. The output of microphone 248 is amplified by amplifier 247 and applied through transformer 249 to common voice communication path, leads ET and ER via leads ETn and ERn and diodes 225 and 226. The common voice communication path transmits the microphone output signals from station Sn to the input of voice switch 200 and thence through intercom link IC1 to station S1. These amplifier facilities are normally in the OFF state being under the control of transistors 243 and 246. Upon the completion of a communication path from station S1 to station Sn, dc bias is placed on communication lead VSn by resistor 205. This dc bias activates transistors 243 and 246 in the loudspeaker and microphone arrangement associated with station set Sn. Power is now supplied to amplifiers 242 and 247 through transistors 243 and 246 and the loudspeaker and microphone arrangement can be utilized by the subscriber at station Sn. DC bias on lead VSn also results in current flow through resistors 206 and 207 to leads ETn and ERn and thence through diodes 225 and 226 to common voice communication path leads ET and ER. This current on leads ET and ER forward biases diodes 225 and 226 and is returned to ground via zener diode 299 thus enabling voice signals to pass through diodes 225 and 226 to voice switch 201.

Coextensive with the path completion, station selector 201 applies an alerting tone burst to the communication path to alert the subscriber at the called station that an incoming call has been completed to the station set. This is accomplished by station selector 201 applying a tone burst signal from the station selector tone generator to the communication path established by the ringer selection network to lead VSn. This tone is amplified at station Sn by amplifier 242 and applied to loudspeaker 241. The application of the audible tone burst to loudspeaker 241 alerts the subscriber at station Sn. The subscriber may now converse with the calling party "hands-free" by utilizing the activated loudspeaker and microphone in station set Sn. This conversation continues uninterruptedly until the calling party goes on-hook, or the called party switches to handset operation, or a preempting call is directed to station Sn.

Attendant Preempting Call

This existing intercom call between stations S1 and Sn can be preempted, as previously mentioned, by either an Automatic Signaling Intercom Call or an Attendant Direct Station Selection call. For simplicity sake, assume that the attendant associated with attendant console AT1 wishes to call the subscriber at station Sn.

The disclosed key telephone system is equipped with attendant facilities, which are thoroughly described in copending application R. H. Bidlack et al, Ser. No. 628,076 and filed Nov. 3, 1975. Briefly summarizing, attendant handset 222 is connected to voice switch circuit 202 which is located in the attendant equipment. The aforementioned two unidirectional communication paths associated with voice switch circuits as used herein are connected through direct station selection key DSSn to leads ETn and ERn, and lead VSn associated with station Sn. Thus, by operating direct station selection key DSSn, the attendant is connected to station Sn by way of voice switch 202 and the existing intercom call is placed on hold by the signal priority circuitry.

Preemption

The signal priority circuitry involved in the attendant preempting the existing intercom call comprises tone burst generators 209 and 210, resistors 204, 205, 206 and 207, preempt detector 208, and diodes 203, 225 and 226. Resistor 205, as previously mentioned, places a dc bias on lead VSn to activate the loudspeaker and microphone arrangement in sttion Sn. The attendant is directly connected into the existing call by direct station selection key DSSn bridging the attendant on to leads ETn, ERn and VSn. However, resistor 204 in the attendant console circuit AT1 supplies a different dc bias to lead VSn than does resistor 205, such that diode 203 is reverse biased. Thus, diode 203 blocks the voice signal from station selector 201 on unidirectional communication lead VSn from reaching station Sn, thereby placing station S1 in an active but noncommunicating condition as long as the attendant is connected to station Sn. The center tap ground applied to voice switch 202 in attendant console AT1 passes through operated make contacts DSSn to leads ETn and ERn. This ground reverse biases diodes 225 and 226, assuring the attendant and the subscriber at station Sn of privacy of communication. The existing intercom call is thereby placed in an active noncommunicating condition by providing a different dc bias on the communication lead VSn.

Tone Signal

A tone burst signal is given to the parties engaged in the existing call to indicate the reason for the call interruption. This is accomplished by using a common contact DSSc of the DSS key to activate tone burst generator 210. Tone burst generators are well known in the art and an example of one can be found in our copending application R. H. Bidlack et al., Ser. No. 628,076 filed Nov. 3, 1975. The output of tone burst generator 210 is applied to unidirectional communication path lead VSn via voice switch 202. This tone signal is transmitted by voice switch 202 over lead VSn to the activated loudspeaker arrangement in station Sn where it is broadcast via loudspeaker 241 to the subscriber at station Sn. The subscriber at station S1 is alerted by the application of a tone to leads T and R by tone burst generator 209. This is accomplished by preempt detector 208 detecting the reverse biased condition of diode 203 and thence activating tone burst generator 209. Tone burst generator 209 applies a tone signal to leads T and R to intercom link IC1 and thence via leads T1 and R1 to station S1.

Thus, the attendant at attendant console AT1 has, by the simple operation of a direct station selection key, automatically placed the existing intercom call in an active but noncommunication condition, has provided a tone indication to the parties engaged in that existing call, and has become directly connected to the called station Sn for communication purposes.

The loudspeaker and microphone facilities in station Sn remain activated by the application of a dc bias on lead VSn by resistor 204. The subscriber at station Sn may thereby answer the preempting attendant direct station selection call "hands-free" by utilizing the activated loudspeaker and microphone arrangement.

Automatic Signaling Intercom

In a similar fashion, automatic signaling intercom calls can preempt intercom and central office calls. Automatic signaling intercom comprises stations AIC1-AICk connected in common to leads AT1 and AR1. By simply going off-hook on automatic signaling intercom line, leads AT1 and AR1, station AIC1 is connected to station Sn. This is accomplished by automatic signaling intercom circuit 219 which contains standard battery feed circuit 220, A lead detector 217, amplifier 218, and relay Y. By going off-hook at station AIC1 on automatic signaling intercom line, leads AT1 and AR1, the station 'A' lead, lead AA1 is activated. This active state of lead AA1 is detected by A lead detector 217 which, in turn, operates relay Y. Relay Y operated connects the automatic signalling intercom circuit through operated make contact Y4, amplifier 218 and operated make contact Y1 to lead CO1, one of the inputs to key telephone station Sn. DC bias is applied to this communication path by resistor 214, activating the loudspeaker circuitry of station Sn. Additionally, operated break contact Y2 opens lead VSn between station selector 201 and station Sn, thus placing the existing intercom call in an active noncommunicating condition. The operation of relay Y also applies a ground through operated make contact Y3 to tone burst generator 213, activating this circuit. Tone burst generator 213 applies the tone signal to lead AI1, through enabled make contact Y1 to lead CO1. The tone signal passes through diode 215, dc blocking capacitor 250, is amplified by amplifier 242 and is finally applied to loudspeaker 241 in station Sn to alert the subscriber at this station.

The subscriber at station S1 must also be alerted, and this is accomplished by preempt detector 208 and tone burst generator 209. Operated break contact Y2 opens the VSn lead between station selector 201 and station Sn. Therefore, this open circuit condition is detected by preempt detector 208, which in turn activates tone burst generator 209. The tone signal from generator 209 is applied to the input of voice switch 200 where it is carried by leads T and R, through intercom link IC1, and over leads T1 and R1 to station S1. Therefore, automatic signaling intercom circuit 219, by opening the VSn lead, automatically placed the intercom call in an active noncommunicating condition, caused an alerting tone to be given to the subscriber engaged in the existing intercom call.

The operation of the various other combinations of calls, including preempting calls being preempted by still higher priority calls, is fairly straightforward in light of the above described call sequences and will, therefore, not be discussed.

While a specific embodiment of the invention has been disclosed, variations in procedural and structural detail within the scope of the appended claims are possible, and are contemplated. There is no intention of limitation to what is contained in the abstract of the disclosure as herein presented. The above described arrangements are only illustrative of the application of the principles of the invention. Normally, other arrangements may be devised by those skilled in the art without departing from the spirit and scope of the invention.

What is claimed is:

1. In a key telephone system having a plurality of key telephone station sets wherein a plurality of types of calls can be received by each of said key telephone station sets, a signal priority arrangement comprising:

means for assigning a priority to every call in said key telephone system wherein said priority is solely an indication of the type of call, means responsive to the receipt of an incoming call at a called one of said key telephone station sets already engaged in an existing call for determining whether said priority assigned to said incoming call is higher than the priority assigned to said existing call, means responsive to a determination that said incoming call has a higher priority than does said existing call for placing said existing call in an active noncommunicating condition, and for concurrently completing said incoming call to said called key telephone station set, means responsive to said determining means indicating that said incoming call has a higher priority than said existing call for generating a distinctive audible tone burst signal, and means responsive to said generating means for applying said generated audible tone burst signal to the communicating leads of said existing call.

2. Invention of claim 1 wherein intercom calls have a higher priority than incoming central office calls.

3. The invention of claim 2 wherein automatic signaling intercom calls have a higher priority than both intercom and incoming central office calls.

4. The invention of claim 3 additionally comprising at least one attendant position circuit having associated therewith direct station selection means wherein a direct station selection call has a higher priority than automatic signaling intercom calls, intercom calls, and incoming central office calls.

5. In a telephone system having a plurality of telephone station sets wherein each of said telephone station sets is capable of receiving a plurality of types of calls, a call priority arrangement comprising:

a plurality of communication leads corresponding on a one-to-one basis to each of said types of calls;

means for assigning a priority to each of said plurality of communication leads;

a plurality of dedicated communication paths corresponding on a one-to-one basis to each of said plurality of telephone station sets for connecting said telephone station sets to said plurality of communication leads;

switching means interposed between said plurality of dedicated communication paths and said plurality of said communication leads responsive to a first incoming call on one of said plurality of communication leads for connecting said first incoming call to the one of said plurality of dedicated communication paths corresponding to the called one of said telephone station sets to which said first incoming call is directed; and wherein said switching means additionally comprises means responsive to the receipt of a second incoming call directed to said called telephone station set on a higher priority one of said communication paths while said first call is in progress for automatically placing said first incoming call in an active noncommunicating condition and for completing said second incoming call to said one of said plurality of dedicated communication paths corresponding to said called telephone station set.

6. The invention of claim 5 additionally comprising:

means responsive to the receipt of said second call while said first call is in progress for generating an audible tone burst signal; and means responsive to said generating means for applying said tone burst signal to said one of said dedicated communication paths corresponding to said called telephone station set and to said one of said plurality of said communication leads associated with said first incoming call.

7. The invention of claim 6 wherein each of said plurality of dedicated communication paths comprises:

a first unidirectional communication path from each said key telephone station set to said switch means, a second unidirectional communication path from said switch means to each of said key telephone station sets;

wherein said key telephone station set additionally comprises:

microphone means for providing voice signal representations of audible signals appearing at the input of said microphone means to said first unidirectional communication path, loudspeaker means for providing audible representations of voice signals appearing on said second unidirectional communication path;

means operable in response to the establishment of said second call for activating said microphone means and said loudspeaker means of said called key telephone station set such that a subscriber at said called key telephone station set can communicate "hands-free" with the party calling over said higher priority dedicated communication path.

8. The invention of claim 7 wherein said microphone means and said loudspeaker means in said called key telephone station set are enabled by a dc bias placed by said switch means on said first unidirectional communication path corresponding to said called key telephone station set.

9. The invention of claim 8 wherein:

said priority assigning means contains a plurality of dc bias means corresponding on a one-to-one basis to each of said communication leads wherein each said dc bias means produces a distinctive dc signal such that the magnitude of said dc signal appearing on said communication leads is indicative of the priority assigned the type of call associated with said communication lead;

said switching means contains a plurality of diode means corresponding on a one-to-one basis to each of said communication leads wherein said diode means are connected in series in each of said communication leads; and said switch means contains means for connecting said plurality of diode means to a common point wherein the dc signal on the highest priority communication lead reverse biases said diode means associated with all lower priority communication leads such that only the diode means associated with the highest priority active communication lead can conduct.

* * * * *